United States Patent [19]
Powell

[11] Patent Number: 5,629,808
[45] Date of Patent: May 13, 1997

[54] D-SHAPE LASER BEAM PROJECTOR

[75] Inventor: Ian Powell, Gloucester, Canada

[73] Assignee: National Research Council of Canada, Ottawa, Canada

[21] Appl. No.: 573,124

[22] Filed: Dec. 15, 1995

[51] Int. Cl.[6] .............................. G02B 13/18; G02B 3/02
[52] U.S. Cl. ............................................ 359/719; 359/709
[58] Field of Search .................................. 359/708, 709, 359/718, 719

[56] References Cited

U.S. PATENT DOCUMENTS 4,826,299  5/1989  Powell ................................. 359/719
5,283,694  2/1994  Frady .................................. 359/719

*Primary Examiner*—Scott J. Sugarman
*Attorney, Agent, or Firm*—Juliusz Szereszewski

[57]  ABSTRACT

An optical lens is useful as a D-shape laser beam projector. The lens consists of a known linear diverging element enabling the expansion of a laser beam into an uniform line, and a matching section of an axicon, either a symmetrical half-axicon or a non-symmetrical one, cut in a plane passing through, or nearly through, its apex. The two components, joined together in a plane of cutting of the axicon section, are positioned in a laser beam such that the beam is incident on both apices of the linear diverging element and the axicon section.

16 Claims, 5 Drawing Sheets

D-SHAPE LASER BEAM PROJECTOR

FIELD OF THE INVENTION

This invention relates to an optical element, or lens, for expanding a laser beam, and more particularly, to an optical element for expanding a laser beam to obtain a projected image resembling the letter D, i.e. a semicircle or an arc with its ends joined, or nearly joined, by a straight line. The invention also relates to a beam projector in which the optical element is used.

BACKGROUND OF THE INVENTION

A laser beam can be readily expanded into a line by passing it through a cylindrical lens. However, expanding a typically Gaussian laser beam into a line results in a Gaussian intensity distribution along the length of the projected line. This in turn results in thresholding problems.

U.S. Pat. No. 4,826,299 to Powell describes a single optical element which projects a laser line having uniform intensity along its length. Generally, only one surface of the optical element is responsible for this effect. The divergence of the projected beam is primarily a function of the shape of that surface, more particularly its radius of curvature and conic constant. A secondary influencing factor is the refractive index of the material of the element.

U.S. patent application Ser. No. 08/242,863 now U.S. Pat. No. 5,523,889 describes an optical lens which consists of a number of the elements of the Powell US Patent, supra, mounted into a star-like arrangement, for expanding a laser beam into a corresponding star-shaped projected image.

For inspection purposes, especially in regard to objects having circular symmetry, it is sometimes desirable to project a beam of light in the shape of a "D" so that characterization of the object in question can be realised. The object would generally have a reference surface and the characterization would involve such matters as the degree of symmetry associated with the object, its actual size, alignment etc.

It is an object of the invention to provide a lens enabling the expansion of a laser beam into a semi-circular or similar shape having an outline resembling the letter D.

SUMMARY OF THE INVENTION

According to the invention, there is provided an optical lens which comprises a linear diverging element and a section of an axicon. While the section of the axicon necessary for an exact "D" shape projection would be exactly one half of an axicon cut about a plane running through its apex and parallel to its optical axis, other sections could be envisaged if a shape similar to a "D" was required but where some displacement between the "centres" of the projected line and arc is acceptable. In fact, if the section of axicon used is greater or less than a half, then the arc generated would be correspondingly greater or less than a semi-circle. The linear diverger component and the axicon section are secured together at the cut surfaces. For the regular "D" shape projection (180° arc) this plane would lie parallel to the optical axes associated with both components. For a modified "D" shape projection the cut plane associated with the axicon component may be at an angle to its optical axis. In the latter case, where the section of axicon is non-rotationally symmetrical, the centres of symmetry of the line and the arc projected will not be coincidental. In the case of a symmetrical half-axicon, the centres of symmetry of the arc and the line will overlap.

Both the linear diverging element (called hereinafter also LDE) and the axicon section have each two refractive surfaces, a primary surface and a secondary surface performing respectively a primary function and a secondary function. The plane wherein the two elements are joined is typically, but not necessarily, orthogonal to the primary refractive surface of the LDE and parallel to its optical axis. The secondary refractive surfaces of both LDE and the half-axicon (or axicon section) are generally flat, and they may form a common surface or exhibit a discontinuity (wedge) at the join. However, the secondary surfaces may also be slightly spherical or cylindrical, either positively or negatively.

In operation, the lens of the invention functions as a laser beam projector. For most applications, the lens may be positioned such as to face the incident laser beam with either the primary surfaces of the above-discussed elements or their secondary surfaces. Applications where the latter arrangement would have problems would be those where there is a discontinuity at the join where the secondary surfaces of the LDE and axicon section meet.

The primary surface of the linear diverging element has a surface shape described by the two-dimensional expression $$z = \frac{cy^2}{1 + \sqrt{1-(1+Q)c^2y^2}}$$

where c is the curvature at the apex, Q is the conic constant and the surface is defined in an (x, y, z) Cartesian coordinate system. The conic constant has a negative value. Preferably, it should be in the range from −1 to −1000, but it is feasible to maintain the conic constant between about −0.3 and practically almost (negative) infinity.

The primary surface of the axicon, before cutting, has a surface shape described by the equation $$z = \frac{\rho}{\sqrt{-Q}}$$

where Q is the conic constant and ρ (rho) is the semi-diameter.

It is understandable to those in the art that the two components of the lens of the invention should preferably have matching optical properties.

Since the axicon section has a sharp apex creating an optical discontinuity, while the linear diverging element has a curved apex (optically continuous surface), the apex of the axicon section is preferably polished to a degree wherein the shape of the apex of the axicon (and of course the shape of the entire axicon section) substantially matches the shape of the corresponding side surface of the LDE.

BRIEF DESCRIPTION OF THE DRAWINGS

For more complete understanding of the present invention, reference may now be had to the following description taken in conjunction with the accompanying drawings in which.

DETAILED DESCRIPTION OF THE INVENTION

Figure 1:
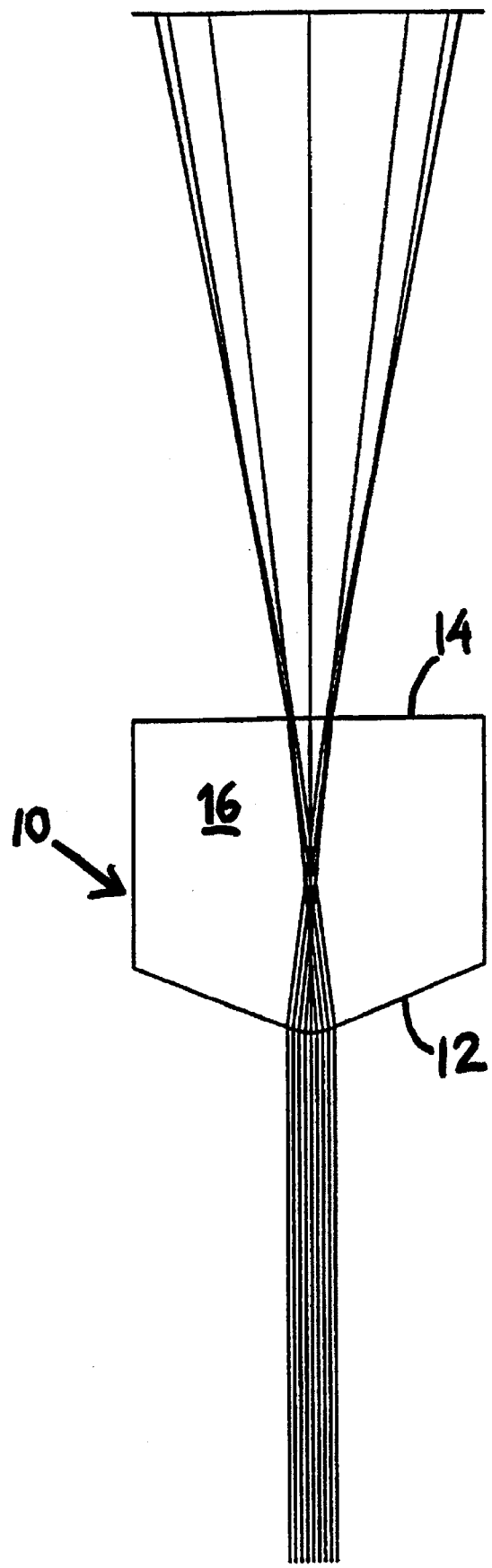
FIG. 1 is a side view of the prior art linear diverging element of U.S. Pat. No. 4,826,299.

FIG. 1 shows, in a side view, a prior art laser beam line expander employing a single optical element 10 having a primary surface 12 and a flat secondary surface 14. A side surface 16 (see also FIG. 4) is used to attach thereto, e.g. by way of an adhesive, a section of an axicon to produce the lens of the present invention. The laser beam expander of FIG. 1 is described in detail in the U.S. Pat. No. 4,826,299 the specification of which is incorporated herein by reference.

The surface shape of the primary surface 12 is such as to spread the energy out more at the centre but at the same time contain it at the edges thus producing a line of more uniform intensity. The surface shape required to effect this is a cylindrical type lens having a very small radius of curvature and a large negative conic constant, typically from −1 to −1000, practically from about −0.3 to ∞ (infinity). This results in the centre and most intense portion of the laser beam seeing a rapidly changing surface and therefore undergoing greater divergence than that found with the less intense portion at the other periphery of the beam. The conic surface is two-dimensional in the (y,z) plane of an (x, y, z) Cartesian coordinate system and can be described by the following equation:

$$z = \frac{cy^2}{1 + \sqrt{1-(1+Q)c^2y^2}}$$

where c is the curvature at the apex, Q is the conic constant and the surface is defined in an (x, y, z) Cartesian coordinate system.

The magnitude of c is generally high in order to achieve the necessary dilution of power at the centre of the beam, typically from 0.02 to 50.0 mm$^{-1}$. The value associated with Q determines the amount of divergence.

The function of the secondary surface is to increase by refraction the divergence of the fan of rays incident on it rather than affect the uniformity over the line's length.

Figure 2:
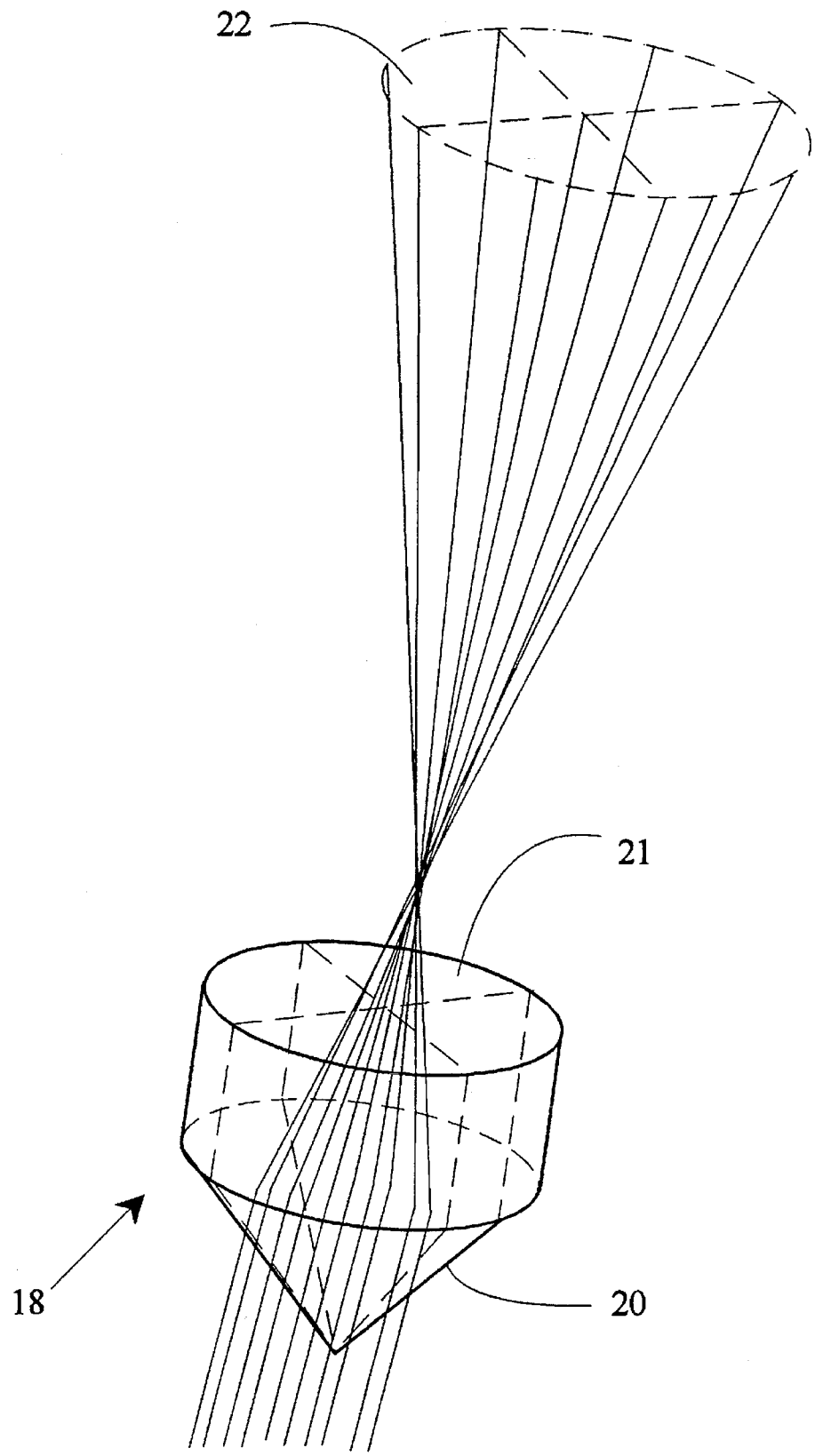
FIG. 2 illustrates a regular axicon as a beam expander.

FIG. 2 illustrates the effect of a collimated laser beam striking a regular axicon 18 along its axis. An axicon is basically a cone; its shape is somewhat similar to that of the linear diverging element described above but differs in that it is rotationally symmetrical rather than having two orthogonal planes of symmetry and has a discontinuity at its apex. The conical surface of an axicon (before cutting) can be represented by the expression $$z = \frac{\rho}{\sqrt{-Q}}$$

where Q is the conic constant and ρ (rho) is the semi-diameter.

When a laser beam strikes the primary surface 20 of the axicon 18, the beam undergoes a refraction at the surface 20, at the secondary surface 21 and projects a circle 22 on a flat target orientated normal to beam projection. Phantom lines on the secondary surface 21 represent an imaginary cutting plane passing through the apex of the axicon. The phantom diameter lines in the projected image 22 correspond to the phantom lines on the secondary surface 21. It is thus clear that an image obtained from a section of the axicon would be an arc corresponding in shape to the base of the axicon section.

As with the linear diverging element, the amount of divergence of an axicon is determined by the value assigned to Q. However, unlike the linear diverger, the axicon has a discontinuity at its apex, i.e. the surface comes to an actual point. On refraction through this element the light spreads out in a rotationally symmetrical fashion. Uniformity of the intensity distribution around the projected arc is a given, simply because of the rotational symmetry of the cone.

Figure 3:
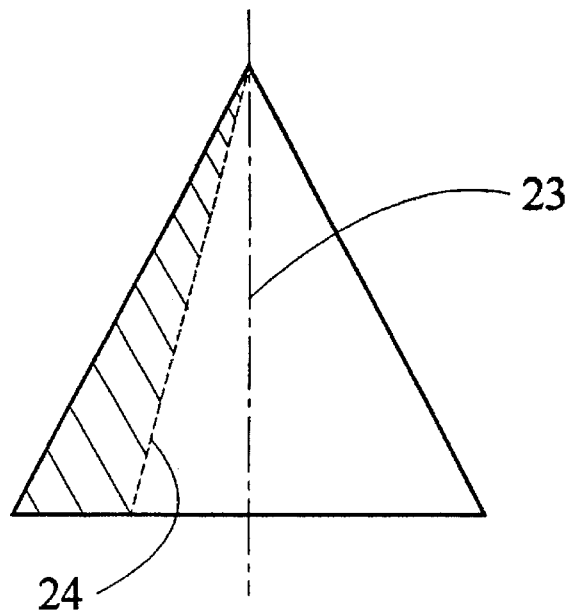
FIG. 3 illustrates the concept of non-symmetrical axicon cutting.

FIG. 3 shows a regular axicon having an optical axis 23. The shaded area represents the cutout portion of the axicon when cut with a plane 24 passing through the apex of the axicon at an angle to the optical axis. This results in a non-rotationally symmetrical axicon section.

Figure 4:
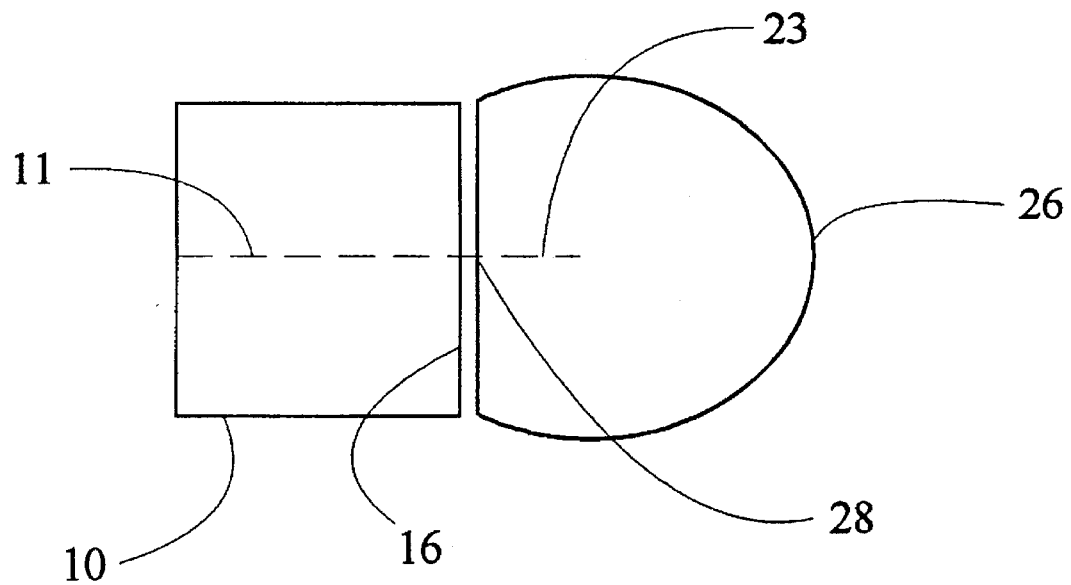
FIG. 4 is a plan view of the lens of the invention employing a non-symmetrical axicon section.

FIG. 4 illustrates an optical lens of the invention produced by joining a LDE 10 with the non-rotationally symmetrical section of an axicon as illustrated in FIG. 3. It will of course be appreciated by those in the art that the shape of the arc 26 is not exactly circular, being rather the projection of a circle at some angle. Nevertheless, the element of FIG. 4 will produce an image resembling the letter D, having both an arc and a straight line.

It will be noted that the apex 11 of the linear diverging element 10 is not a sharp edge and therefore is indicated in phantom line. The line extends into an axis 23 of the axicon section 24. The apex 28 of the axicon section is adjacent to the apex 11 at the joint plane.

Figure 5:
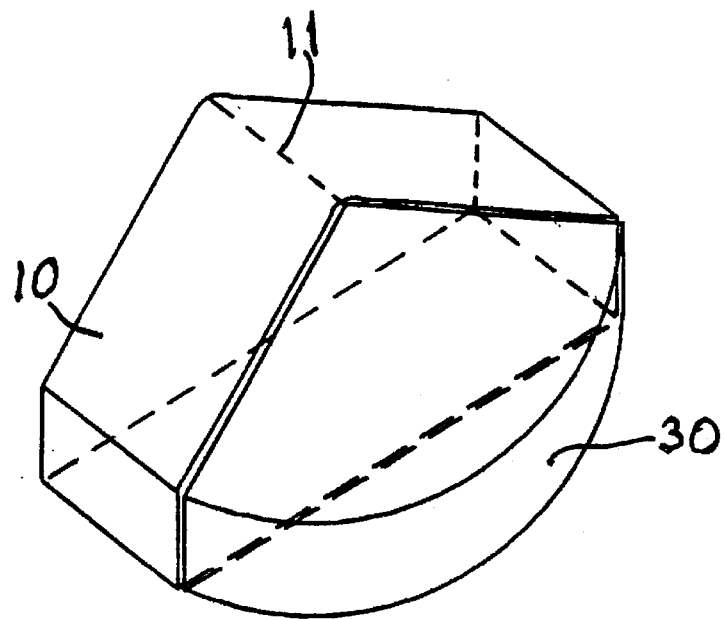
FIG. 5 is an oblique view of one embodiment of the lens of the present invention.

A uniform semi-circle defined by the 180° arc and its diameter, and resembling a D shape, can be projected using a lens obtained by combining the linear diverging element 10 with a symmetrical half-axicon 30 (cut through its axis) in an arrangement as illustrated in FIG. 5. It should be noted again that the apex 11 of the linear diverging element 10 is not an edge. In order to achieve uniformity along the length of the straight-line portion of the D-shape to be projected, the same design parameters—curvature, conic constant, refractive index and size—must be considered for the LDE as given in U.S. Pat. No. 4,826,299. As for the half-axicon, in order to match the diameter of the semicircle to the length of the projected line, its conic constant has to be identical or similar to that of the linear diverger. For certain applications, it may be preferable for these two parameters to have different magnitudes, in which case the conic constants would take on appropriately different values.

A slight variation on having a point at the apex of the axicon component would be to polish a small flat or similar shape, not illustrated, so that the very centre of the beam passes through undeviated, producing a bright spot half way along the diameter of the projected shape.

By adjusting the angle of the cutting plane of the axicon, away from the optical axis of the axicon, one can create a variety of patterns comprising an arc and a line. Besides generating a pattern in which the length of the chord differs from that of the line, one can produce a pattern whereby the geometric centres of the arc and the line are no longer coincidental. This modification of the manner in which the axicon is cut might well be accompanied by a discontinuity at the join of the secondary surfaces. This in effect introduces a wedge between the two secondary surfaces, a move which allows further flexibility in the relative positioning of the line and arc.

While alignment of these two components of the lens of the invention, i.e. the LDE and the axicon section, is relatively critical, it is probably more important that the surfaces be as free as technically possible of any imperfections since this would result in scatter which would adversely affect the projected pattern.

Figure 6:
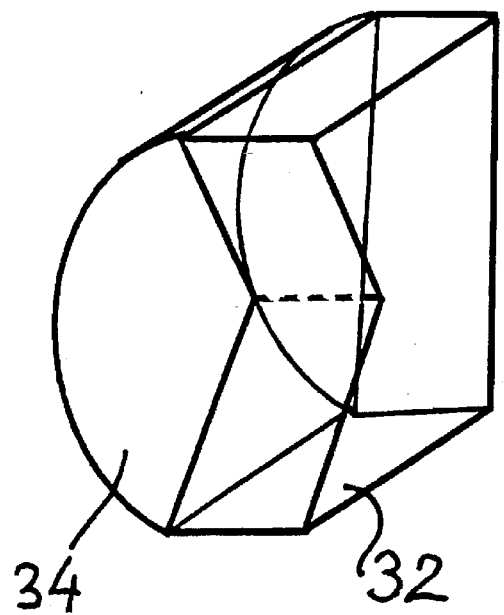
FIG. 6 is an oblique view of another embodiment of the lens.

FIG. 6 shows an alternative embodiment in which negative components, a LDE 32 and a symmetrical half-axicon 34 are employed to achieve the D-shape projecting lens of the invention. Both configurations, that of FIG. 5 and of FIG. 6 can be oriented with their primary surfaces towards or away from the incident laser beam. In both instances, the beam should pass through the join where the apex of the LDE meets that of the axicon, to achieve a proper divergence of the beam.

When an optical lens of the invention is obtained by combining linear diverger with a non-rotationally symmetrical portion of an axicon, the projected pattern is relatively easily predictable when the lens is oriented with its primary surfaces towards the laser beam. However, it may not be as easy to predict the exact pattern when the orientation is reversed i.e. the lens faces the incident beam with its secondary surfaces. Therefore, the embodiment including a regular half-axicon and LDE, which lends itself to reversing with predictable projected beam pattern, is preferable.

Figure 7:
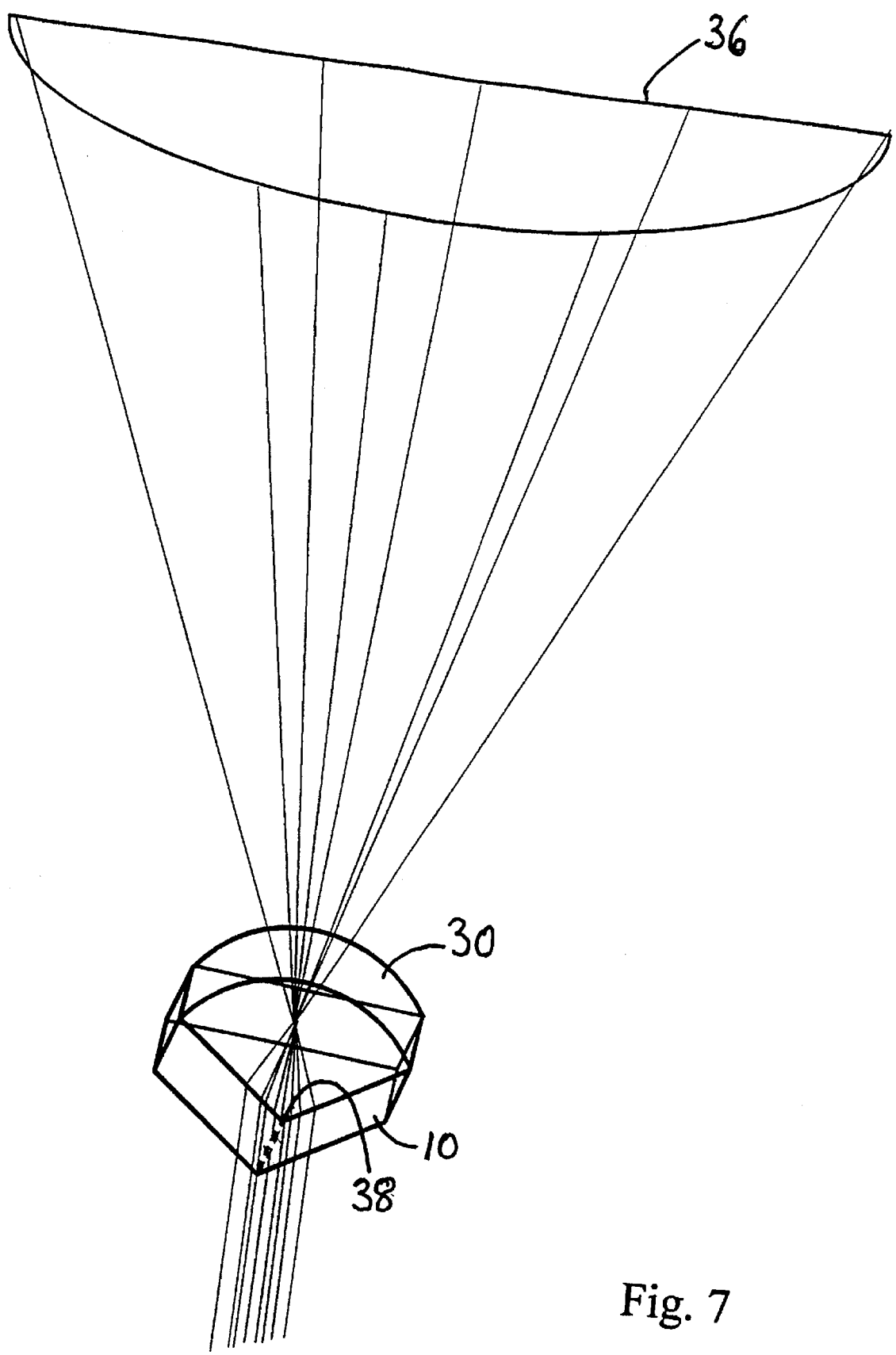
FIG. 7 illustrates an optical arrangement of the D shape projector of the invention.

An optical arrangement of the D-shape beam projecting lens of FIG. 5 is illustrated in FIG. 7 which is self-explanatory. The semicircular shape 36 of the expanded laser beam is shown as a result of the laser beam passing through a common apex 38 of the lens at the plane joining the components i.e. the LDE 10 and the half-axicon 30.

The width of the projected beam can be modified by introducing a small amount of power, for instance a spherical or cylindrical shape, into the secondary surfaces.

In view of several factors combining in the final shape of the projected image (the conic constant, curvature of the LDE apex, refractive index, the angle of axicon cutting, the shape of the secondary surface) it is quite difficult to provide a detailed guidance linking every structural option with a corresponding projected shape. Some routine experimentation within the spirit and scope of the invention as defined by the appended claims may be necessary to arrive at a specific image pattern.

I claim:

1. An optical lens comprising
a linear diverging element having a primary surface, a secondary surface and a side surface,
a section of an axicon cut in a plane passing through its apex or near thereof, said section having a primary surface, a secondary surface and a cut surface and connected with said linear diverging element, said cut surface of said axicon adjoining said side surface of said linear diverging element,
wherein said primary surface of said linear diverging element has a shape described by the equation $$z = \frac{cy^2}{1 + \sqrt{1 - (1+Q)c^2y^2}}$$

where c is the curvature at the apex, Q is the conic constant, and the surface is defined in an (x, y, z) Cartesian coordinate system, the conic constant having a negative value,
and the primary surface of said axicon has a surface shape described by the equation $$z = \frac{\rho}{\sqrt{-Q}}$$

where Q is the conic constant and ρ (rho) is the semi-diameter.

2. The optical lens according to claim 1 wherein said section of an axicon is a symmetrical half-axicon.

3. The optical lens according to claim 1 wherein the conic constant of both said linear diverging element and said section of an axicon is substantially identical and is in a range from about −0.3 to about −1000.

4. The optical lens according to claim 1 wherein said secondary surfaces of both said linear diverging element and said section of an axicon are selected from a group consisting of flat, positively spherical or cylindrical, or negatively spherical or cylindrical.

5. The lens according to claim 1 wherein said primary surfaces are optically positive.

6. The lens according to claim 1 wherein said primary surfaces are optically negative.

7. The lens according to claim 1 wherein said apex of said section of an axicon is polished to match said primary surface of said section with said primary surface of said linear diverging element.

8. A laser beam projector for expanding a laser beam into a shape resembling the letter D, comprising
a source of said laser beam, and
an optical lens comprising
a linear diverging element having a primary surface, a secondary surface and a side surface, and a section of an axicon cut in a plane passing through its apex or near thereof, said section having a primary surface, a secondary surface and a cut surface and connected with said linear diverging element, said cut surface of said axicon adjoining said side surface of said linear diverging element,
wherein said primary surface of said linear diverging element has a shape described by the equation $$z = \frac{cy^2}{1 + \sqrt{1 - (1+Q)c^2y^2}}$$

where c is the curvature at the apex, Q is the conic constant and the surface is defined in an (x, y, z) Cartesian coordinate system, said conic constant having a negative value,
and the primary surface of the half-axicon has a surface shape described by the equation $$z = \frac{\rho}{\sqrt{-Q}}$$

where Q is the conic constant and ρ (rho) is the semi-diameter,
said optical lens being located relative to said source such that, in operation, said beam is incident on both the apex of said linear diverging element and the apex of said half-axicon.

9. The laser beam projector according to claim 8 wherein said section of an axicon is a symmetrical half-axicon.

10. The laser beam projector according to claim 8 wherein the conic constant of said liner diverging element has a value on the range from about −0.3 to about −1000.

11. The laser beam projector according to claim 8 wherein said secondary surfaces are selected from a group of shapes consisting of flat, negatively spherical, positively spherical, negatively spherical and positively cylindrical.

12. The laser beam projector according to claim 8 wherein said primary surfaces are optically positive.

13. The laser beam projector according to claim 8 wherein said primary surfaces are optically negative.

14. The laser beam projector according to claim 8 wherein said primary surfaces are oriented towards said source of said laser beam.

15. The laser beam projector according to claim 9 wherein said primary surfaces are oriented towards said source of said laser beam.

16. The laser beam projector according to claim 9 wherein said secondary surfaces are oriented towards said source of said laser beam.

* * * * *